(12) United States Patent
Hense et al.

(10) Patent No.: US 11,365,924 B2
(45) Date of Patent: Jun. 21, 2022

(54) CONTROL METHOD AND SYSTEM IN A REFRIGERATION SYSTEM AND COMPRESSOR OF A REFRIGERATION SYSTEM

(71) Applicant: Embraco Industria de Compressores e Solucoes em Refrigeracao Ltda, Joinville (BR)

(72) Inventors: Daniel Hense, Joinville (BR); Lucas Becker, Joinville (BR); Marcio Roberto Thiessen, Joinville (BR)

(73) Assignee: EMBRACO INDÚSTRIA DE COMPRESSORES E SOLUÇÕES EM REFRIGERAÇÃO LTDA., Joinville (BR)

( * ) Notice: Subject to any disclaimer, the term of this patent is extended or adjusted under 35 U.S.C. 154(b) by 474 days.

(21) Appl. No.: 16/360,909

(22) Filed: Mar. 21, 2019

(65) Prior Publication Data
US 2020/0263912 A1 Aug. 20, 2020

(30) Foreign Application Priority Data
Feb. 18, 2019 (BR) .................... BR102019003311-8

(51) Int. Cl.
| | | |
|---|---|---|
| *G05B 21/00* | (2006.01) | |
| *G01M 1/38* | (2006.01) | |
| *G05B 13/00* | (2006.01) | |
| *G05B 15/00* | (2006.01) | |
| *G05D 23/00* | (2006.01) | |

(Continued)

(52) U.S. Cl.
CPC .......... *F25B 49/022* (2013.01); *G05B 19/042* (2013.01); *F25B 2600/01* (2013.01); *F25B 2600/0253* (2013.01); *G05B 2219/2654* (2013.01)

(58) Field of Classification Search
CPC .......... F25B 2600/01; F25B 2600/0253; F25B 49/022; F25B 49/025; G05B 19/042; G05B 2219/2654; F04B 49/06; F04B 49/065; F04C 28/08; F04C 28/28
See application file for complete search history.

(56) References Cited

U.S. PATENT DOCUMENTS 6,826,917 B1 * 12/2004 Bodell, II ............. F25B 49/022
62/115
7,228,694 B2 6/2007 Schwarz et al.
(Continued)

FOREIGN PATENT DOCUMENTS

WO WO 98/15790 4/1998

*Primary Examiner* — Zhipeng Wang
(74) *Attorney, Agent, or Firm* — Foley & Lardner LLP (57) ABSTRACT

A control method and a control system for a compressor in a refrigeration system, implements control logic based on the monitoring of parameters of the refrigeration system, where these parameters may include, for example, a previous load ($C_{ant}$), a current load ($C_{atu}$), a reference load ($C_{ref}$), a measured cycle time ($t_{cycle}$) and a target time ($t_{target}$).

15 Claims, 8 Drawing Sheets

(51) Int. Cl.
F25B 49/02 (2006.01)
G05B 19/042 (2006.01)

(56) References Cited

U.S. PATENT DOCUMENTS

2013/0064684 A1  3/2013  Endou
2020/0400355 A1* 12/2020  Park .................. F25D 29/00

* cited by examiner

CONTROL METHOD AND SYSTEM IN A REFRIGERATION SYSTEM AND COMPRESSOR OF A REFRIGERATION SYSTEM

CROSS REFERENCE TO RELATED APPLICATION

This application claims priority under 35 USC § 119 to Brazilian Patent Application No. BR102019003311-8 filed Feb. 18, 2019 (02/18/2019), and the entire disclosure of said application is hereby expressly incorporated by reference into the present application.

The present invention concerns a control method and a control system of a compressor in a refrigeration system through the implementation of at least one control logic based on the monitoring of parameters of the refrigeration system. The present invention also concerns a compressor of a refrigeration system.

The present invention concerns a control method and a control system of a compressor in a refrigeration system through the implementation of at least one control logic based on the monitoring of parameters of the refrigeration system. The present invention also concerns a compressor of a refrigeration system.

DESCRIPTION OF THE STATE OF THE ART

In recent decades, with advances in electronics, the refrigeration field has been revolutionized. The technologies developed allow for compressors to be smaller, more efficient and of improved performance when compared to those of constant speed. These results were only possible due to the use of the electronic inverter, which activates the motor at different speeds, allowing for the possibility of adjusting the capacity of refrigeration to an instantaneous demand.

Firstly, unlike the common ON/OFF compressors which require a simple mechanical thermostat, the variable capacity compressor depended on an electronic controller to adjust the desired speed. Since this solution comprises an additional cost to be implemented, a barrier has been initially created to bolstering this technology in the refrigeration market.

However, having observed the global goal for efficiency improvement and the possibility of leveraging the previously known concept, the present routine was developed. This resource allows the use of variable speed compressors with the same mechanical thermostat as an input signal for switching on and off, but allowing the inverter to decide the best speed based on the current status of the compressor. This means there are no changes in the system for the original manufacturer of the equipment, or other additional costs, and a better performance from the solution.

The original concept was conceived to adapt the refrigeration capacity based on the thermal demand, which is to say, depending on the load felt by the electric motor of the compressor, its speed may increase or reduce. More specifically, based on a verification of the behavior of for example, electric magnitude, it is possible to determine a behavior (tendency) of the load in the motor of the compressor, especially regarding the taking of certain decisions in the refrigeration system based on the behavior of the load.

PCT international application publication number WO98/15790, United States Patent U.S. Pat. No. 7,228,694B2 and also United States Patent document number US2013/0064684A1, for example, describe solutions based on a target time, lacking routines, steps and components configured to stabilize specific parameters of the refrigeration system and to recognize disturbances.

Up to the present, the solution worked adequately in the home appliances field, the residential user being the principal type of user of this resource. However, with the migration of the ON/OFF technology to the inverter in the commercial field, where there are many systems with different characteristics, this solution proved obsolete.

This is because variable speed compressors require an electronic thermostat to be controlled, which adds cost to the system. Allied to this, the levels of efficiency are not optimized because they do not take into account installed capacity in the refrigerator and have their performance reduced due to the fact that they do not respond to disturbances in the system.

More specifically, we do not observe in the state of the art, solutions configured to realize given cycles in order to stabilize a load of the refrigeration system (such as torque) and also to monitor the occurrence or otherwise of disturbances in the refrigeration system based on the measuring of a series of magnitudes related to the cited system.

OBJECTIVES OF THE INVENTION

One objective of the present invention is to provide a control method and a control system for a compressor in a refrigeration system.

One objective of the present invention is to provide a control method and a control system for a compressor in a refrigeration system which allows for the use of an ON/OFF thermostat in the control of the speed of a compressor.

One objective of the present invention is to provide a control method and a control system for a compressor in a refrigeration system which allows for the adjustment of the time cycles in accordance with the user's desire.

One objective of the present invention is measuring the mainly electrical and mechanical parameters of the refrigeration system.

One objective of the present invention is to identify and correct disturbances in the refrigeration system and to activate the compressor at an angular speed of greater efficiency for the cited refrigeration system.

One objective of the present invention is to provide a variable speed compressor configured in accordance with the method and system of control of the present invention.

BRIEF DESCRIPTION OF THE INVENTION

The objectives of the present invention are achieved by means of a control method and a control system for controlling a compressor in a refrigeration system using at least one general logic and one specific logic, where the general logic comprises at least one step of measuring torques and a step of measuring the cycle time, and the specific logic comprises at least one step of monitoring disturbances.

SUMMARIZED DESCRIPTION OF THE DRAWINGS

The present invention shall be described in more detail below based on an example of execution represented in the drawings. The figures show the following:

FIG. 6—is an exemplification of a complete waveform using unit gain, from the moment when the inverter is switched on;

FIG. 7—is an exemplification of a complete waveform a gain equal to two, from the moment when the inverter is switched on;

DETAILED DESCRIPTION OF THE FIGURES

In principle, the present invention concerns a method and system for controlling a compressor in a refrigeration system. Refrigeration system hereby preferably means a system configured in devices and equipment such as fridges, freezers, and refrigerators in general both for domestic use (household appliances) and for commercial use.

Moreover, the compressor to which the present invention refers to is configured as a variable speed compressor. More specifically, the cited compressor is configured in order to be compatible with the features of the method and system that are also the object of this invention.

In a general sense, the present invention is preferably configured through the implementation of at least on control logic based on the monitoring of parameters of the refrigeration system, which will be described in more detail below.

As such, in one configuration of the present invention, for the effective implementation of this logic, the control method of the compressor is configured to perform, in a general sense, at least the following steps:

Obtaining a previous load ($C_{prev}$) and a current load ($C_{atu}$);

Obtaining a measured cycle time ($t_{cycle}$) and a target time ($t_{target}$), where the target time ($t_{target}$) is stipulated by a user.

It is important to observe that in one configuration, the previous load ($C_{prev}$) and current load ($C_{current}$) are obtained, for example, based on a measurement of torques. However, these loads may alternatively be obtained through the measuring and/or verification of other features related to the load of the refrigeration system, such as electric current, for example.

Obviously, the nature of said loads is not a limitation of the present invention, such that the objectives of the present invention may be achieved by verifying different features.

In addition to this, it is observed that the target time ($t_{target}$) may be configured like an on time or an off time, or even as a running time ratio, for example.

One configuration of the control method of a compressor in a refrigeration system occurs through a general logic and a specific logic.

The general logic which comprises the method which is the object of the present invention basically concerns the behavior expected of a compressor of the refrigeration system during its entire working time and the principal routine of this resource. In one configuration, this logic can be divided into cycles, comprising a pull-down cycle and a normal cycle, for example.

When an inverter of the refrigeration system is energized, a pull-down state is configured. In this state, the compressor operates at an optimum (ideal) speed, such as a permitted maximum speed, and may also operate at intermediate speeds before achieving the optimum speed. Either way, this operation of the compressor is configured to generate more cooling capacity of the refrigeration system to reduce a pull-down time (set point, which is to say, the time for a given temperature to be reached by the refrigeration system, achieving stability). This state is maintained until the pull-down cycle (state) ends.

To identify the end of the pull-down state, when a thermostat of the refrigeration system is switched off, the system compares a final load measured with the same measurement of the previous cycle. If this variation is within an interval, the pull-down will be concluded; if not, the system repeats this procedure.

As such, the general logic comprises at least on step of measuring loads (pull-down cycle) configured at least with one load stabilization cycle and one cycle time measuring step being configured as a normal cycle.

In this configuration, the following steps are performed:

Obtaining a difference between the previous load ($C_{ant}$) and the current load ($C_{atu}$) in the torque stabilization cycle;

Comparing the cycle time measured ($t_{cycle}$) and the target time ($t_{target}$) in the normal cycle, with the normal cycle being configured as an angular speed control cycle of the compressor.

As previously mentioned, the method of the present invention comprises a step of obtaining a previous load ($C_{ant}$) and a current load ($C_{atu}$).

As such, it is observed that in one configuration, in the load stabilization cycle, a step is realized of obtaining at least one previous load ($C_{ant}$), the current load ($C_{atu}$) and a cycle load ($C_{cpd}$).

Moreover, the load stabilization cycle comprises an additional step of comparing the cycle load ($C_{cpd}$) with a reference load ($C_{ref}$), which reference load ($C_{ref}$) is previously stipulated. Based on this comparison, it is determined whether the cited load stabilization cycle is or is not concluded. If it is not, the comparison of the load values is repeated, as previously mentioned. It is observed that this step characterizes a verification of the conclusion or otherwise of the cited load stabilization cycle. This is because a thermal load of the refrigeration system tends to decrease over time, causing the obtained load cycle ($C_{cpd}$) to also decline, but with the compressor motor's losing rotation, which can be kept constant. It is noted that the load stabilization cycle is configured to optimize a refrigeration capacity of the refrigeration system and minimize a temperature homogenization time in a thermal load.

It is also important to note that the cycle load ($C_{cpd}$) is preferably obtained through the difference between the previous load ($C_{ant}$) and the current load ($C_{atu}$).

In this scenario, as previously described, the load stabilization cycle repeats while the cycle load ($C_{cpd}$) is greater than, or equal to, the reference load ($C_{ref}$).

Figure 1:
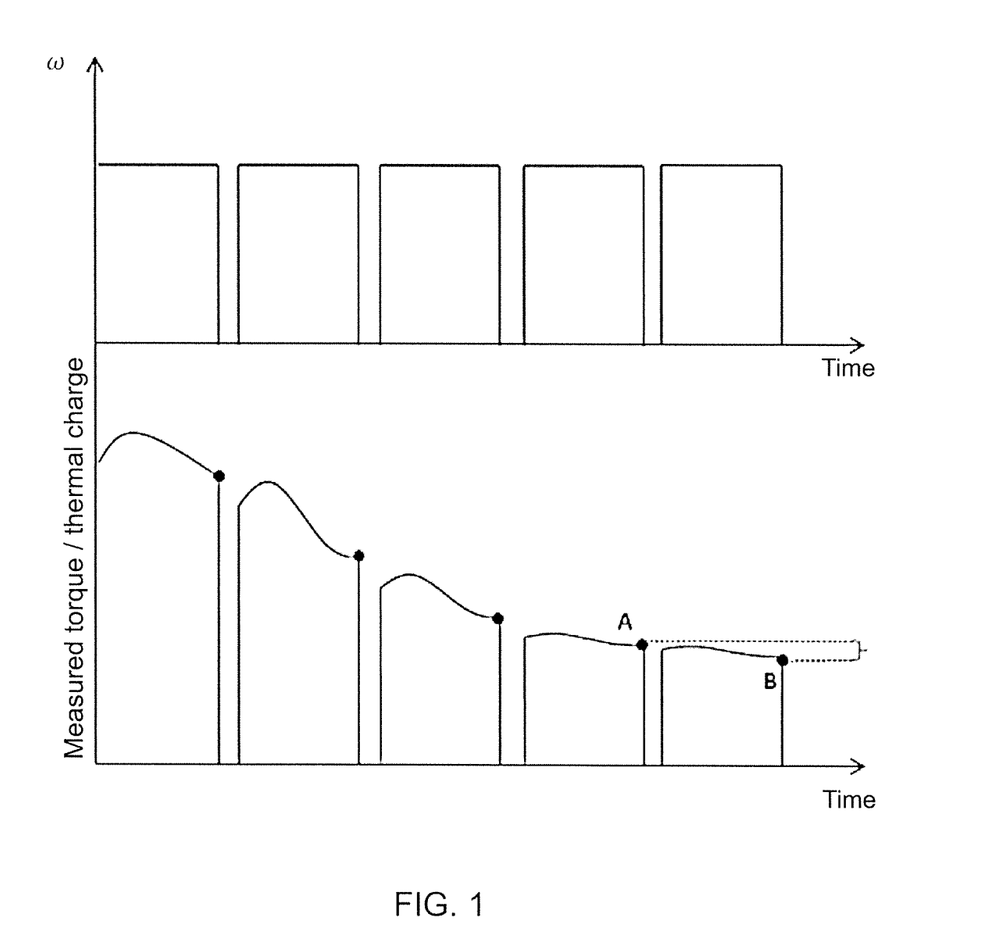
FIG. 1—is a waveform of the speed and temperature of the load.

To exemplify this configuration, FIG. 1 shows a waveform of the speed and temperature of the load. It is possible to observe in this figure that the variation in load between cycles indicates that the temperature of the load is still not stable (uniform) and the system should remain in the load stabilization cycle.

However, when the load variation (points A and B in FIG. 1, for example) is within a specified interval, which is to say, cycle load ($C_{cpd}$) less than the reference load ($C_{ref}$), it is understood that the temperature is uniform and stabilized.

So the refrigeration system may alter its operation for the subsequent cycle, which is to say, for the normal cycle.

Also regarding FIG. 1, it is important to note that the thermostat can switch off the refrigeration system at any time, even without the thermal load having been stabilized. As such, a sensor of the thermostat may detect the temperature of the set point and switch off the refrigeration system depending on its position and on an airflow of the system, for example, even if the temperature is not homogeneous. In addition to this, the cycle may be interrupted to cause a defrosting cycle, if disturbances are detected.

It is noted regarding FIG. 1 that the load stabilization cycle (or pull-down cycle) may be seen during five cycles. After this, when the stabilization point is reached, which is to say, the current load ($C_{atu}$) is lower than the reference load ($C_{ref}$), the operation of the refrigeration system is altered to the normal cycle.

It should be noted that there is no extra sensor like the temperature sensor in the present invention. As such the magnitudes related to the temperature of the thermal load are inferred from the electrical magnitudes of the compressor, as already described. Moreover, thermal loads may be understood, for example, as objects to be refrigerated by the refrigeration system.

Regarding the normal cycle, this must be understood as a routine configured to select the best speed to operate the compressor, in order to achieve the desired cycle time. This cycle time is defined by the user through a specific interface, such as a computer program, tool or application.

As previously mentioned, the method of the present invention comprises a step of obtaining a measured cycle time ($t_{cycle}$) and a target time ($t_{target}$), where the target time ($t_{target}$) is stipulated by a user. It should be observed that the target time ($t_{target}$) may be configured like an on time, off time or also as a running time ratio, for example. As such, in one configuration, this step is performed in the normal cycle.

Furthermore, the normal cycle may comprise an additional step of comparing the measured cycle time ($t_{cycle}$) and the target time ($t_{target}$) and an additional step of selecting a desired angular speed ($\omega_{next}$) of the compressor, where the desired angular speed ($\omega_{next}$) of the compressor is configured to optimize the efficiency of the refrigeration system.

In one embodiment, the desired angular speed ($\omega_{next}$) of the compressor is selected based on at least one of the following: a current speed ($\omega_{current}$) of the compressor, a gain (Agr) and a speed step unit ($\omega_{ssu}$), also taking into account the result obtained from the comparison between the measured cycle time ($t_{cycle}$) and the target time ($t_{target}$).

To exemplify this configuration, four possible scenarios are listed below, related to the selection of the desired angular speed ($\omega_{next}$) in relation to the parameters previously mentioned. In these examples, it is observed that the speed step unit ($w_{ssu}$) assumes a value of 200 rpm and the gain (Agr) must be understood as a previously stipulated parameter. It is important to note that these are only examples of one possible configuration of the present invention, and do not have a limiting character in relation to the same:

Scenario A: $t_{cycle} < 0.5 * t_{target}$

Figure 2:
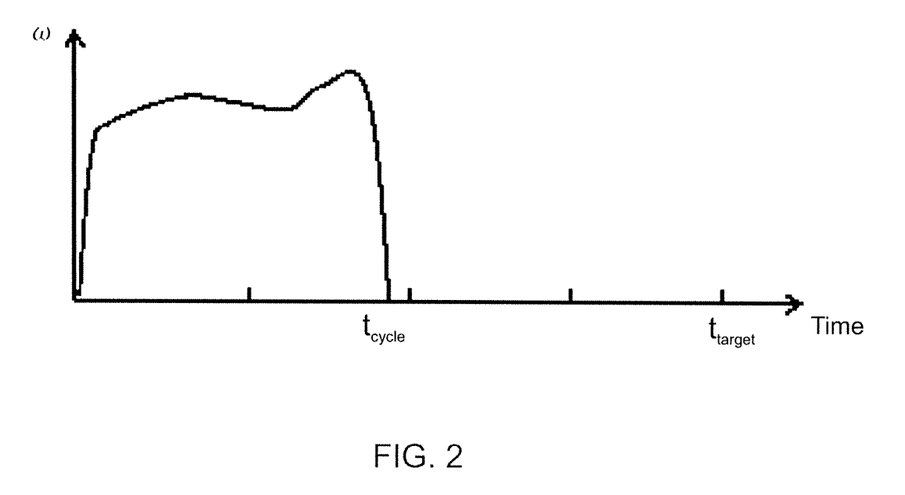
FIG. 2—is an exemplification of a cycle which ends before 50% of a target time.

In this case, when the cycle ends before 50% of the target time ($t_{target}$), the compressor will reduce 3 speed steps multiplied by the gain (Agr), as exemplified in FIG. 2 considering a target time ($t_{target}$) of 100 minutes:

$$\omega_{next} = \omega_{atual} - (3 * Agr * \omega_{ssu}) \quad \text{Eq. 1}$$

Scenario B: $0.5 * t_{target} < t_{cycle} < 0.8 * t_{target}$

Figure 3:
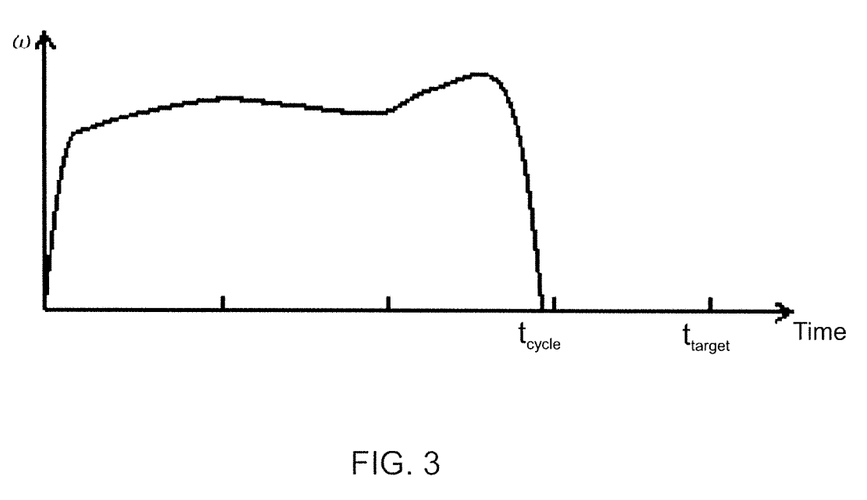
FIG. 3—is an exemplification of a cycle which ends between 50% and 80% of a target time.

In this case, when the cycle ends between 50% and 80% of the target time ($t_{target}$), the compressor will reduce 1 speed step, as exemplified in FIG. 3 considering a target time ($t_{target}$) of 100 minutes:

$$\omega_{next} = \omega_{atual} - (\omega_{ssu}) \quad \text{Eq. 2}$$

Scenario C: $0.8 * t_{target} < t_{cycle} < t_{target}$

Figure 4:
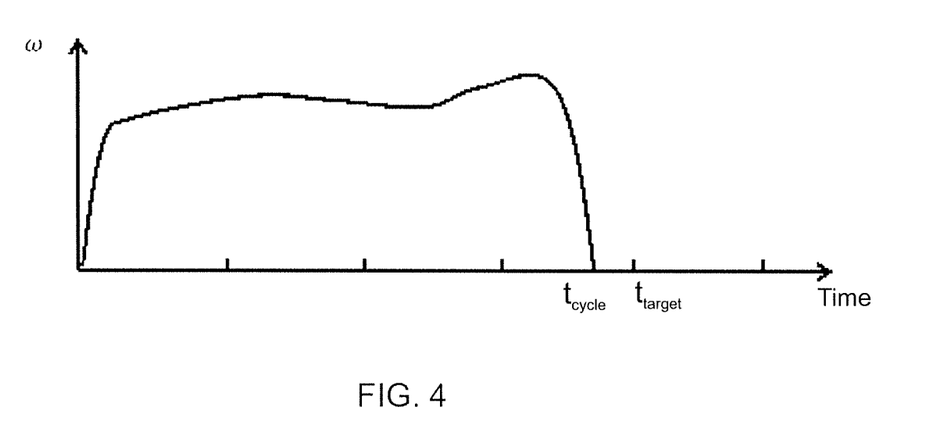
FIG. 4—is an exemplification of a cycle which ends between 80% and 100% of a target time.

In this case, when the cycle ends at between 80% and 100% of the target time ($t_{target}$), the compressor will maintain the same speed for the next cycle, as exemplified in FIG. 4 considering a target time ($t_{target}$) of 100 minutes:

$$\omega_{next} = \omega_{atual} \quad \text{Eq. 3}$$

Scenario D: $t_{target} < t_{cycle}$

Figure 5:
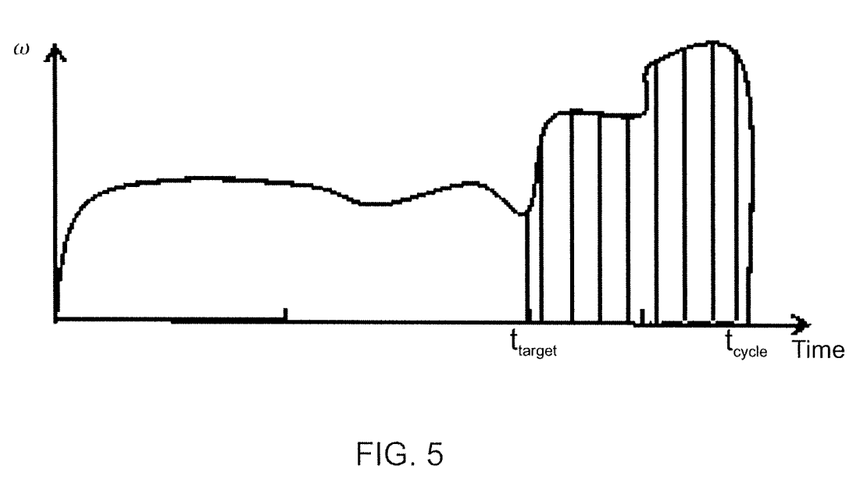
FIG. 5—is an exemplification of a cycle which ends after a target time.

In this case, when the cycle exceeds the target time ($t_{target}$), the system increases the speed by 1 speed step multiplied by the gain (Agr) with each given period of time, as exemplified in FIG. 5, considering a target time ($t_{target}$) of 100 minutes and a time period of 20 minutes for increments in speed. So the last speed will be the next speed:

$$\omega_{next} = \omega_{atual} + (Agr * \omega_{ssu}) \quad \text{Eq. 4}$$

It is also important to note that the present invention may be configured to also act in a particular case, scenario D, where the target time ($t_{target}$) is less than the cycle time ($t_{cycle}$) and the system remains at a given speed for a short time (less than the period of time stipulated—20 minutes, in the case of the example mentioned, which is to say, it remains at this speed only for a portion of the stipulated period of time and not for the entire period of time). In this case, the next speed ($\omega_{next}$) will be configured as the speed prior to the last speed ($\omega_{actual-1}$), namely:

$$\omega_{next} = \omega_{atual-1} \quad \text{Eq. 5}$$

Figure 6:
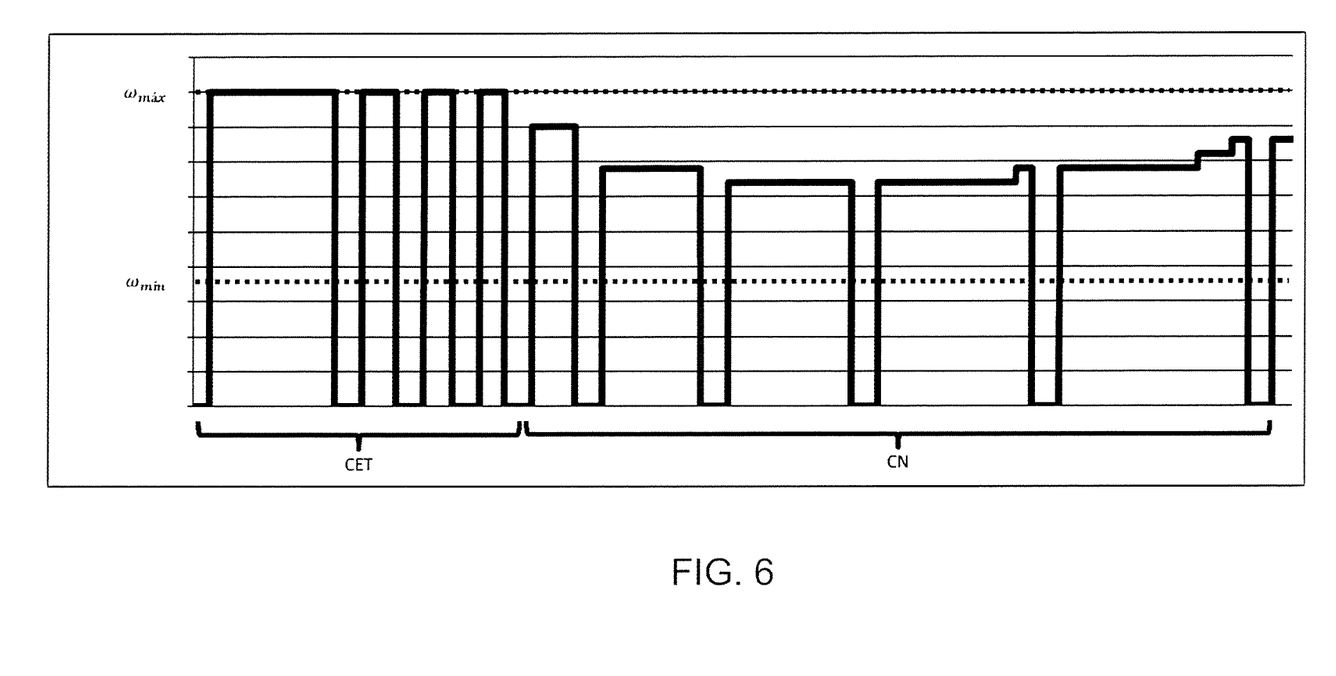

FIG. 6 represents a complete graph using the unit gain (Agr) (Agr=1), from the moment when the inverter is switched on. In this figure, after being switched on, it is observed that the refrigeration system remains in the load stabilization cycle for the first four cycles. After this, the speed is adjusted until the cycle attains the desired time (first and second cycles). In the third cycle, it is observed that the system is stable.

If, for some reason, the target time ($t_{target}$) elapses without switching off the compressor, the speed will be increased, for example, every 20 minutes, as is observed in the fourth and fifth cycles. Based on the previous examples, it is observed that if the user wishes to alter the gain (Agr) it is possible to make the system more or less "aggressive".

Figure 7:
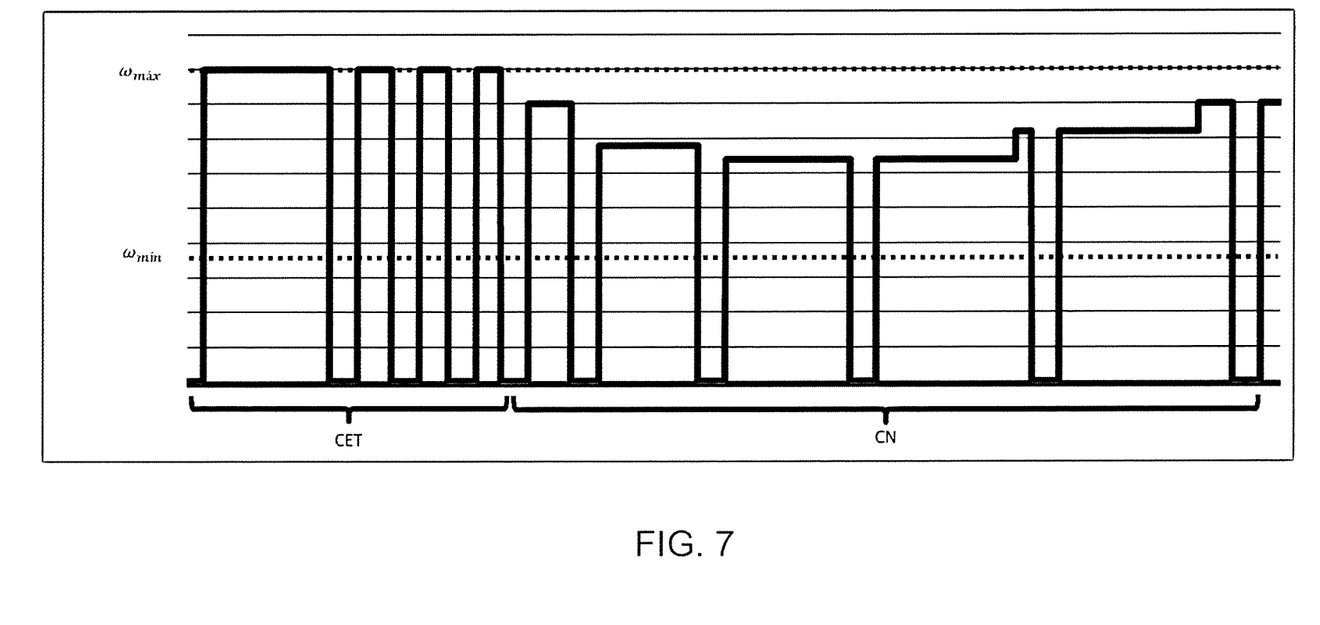

So, like FIG. 6, FIG. 7 also represents a complete graph, but using a gain (Agr) equal to two (Agr=2).

Obviously, the values previously cited are mere possible examples to be used in the present invention and should not be understood as limiting characteristics thereof.

It is important to observe that, in one configuration, other parameters related to the refrigeration system or components connected to it may also be used to select the desired angular speed ($\omega_{next}$) of the compressor, such as capacity, current or the instantaneous speed of the compressor, for example.

The results principally exemplified in FIGS. 6 and 7 were obtained using constant speeds during the cycle. This means that the speed is altered only between the cycles or when the target time ($t_{target}$) has elapsed.

However, one configuration of the present invention also allows for the configuration of a number of steps ($n_{etapas}$) which will occur in the cycle. With this parameter, the control increases the speed based on the target time ($t_{target}$)

and target considering the number of steps ($n_{etapas}$) plus one unit (which is to say, $n_{etapas}+1$).

Figure 8:
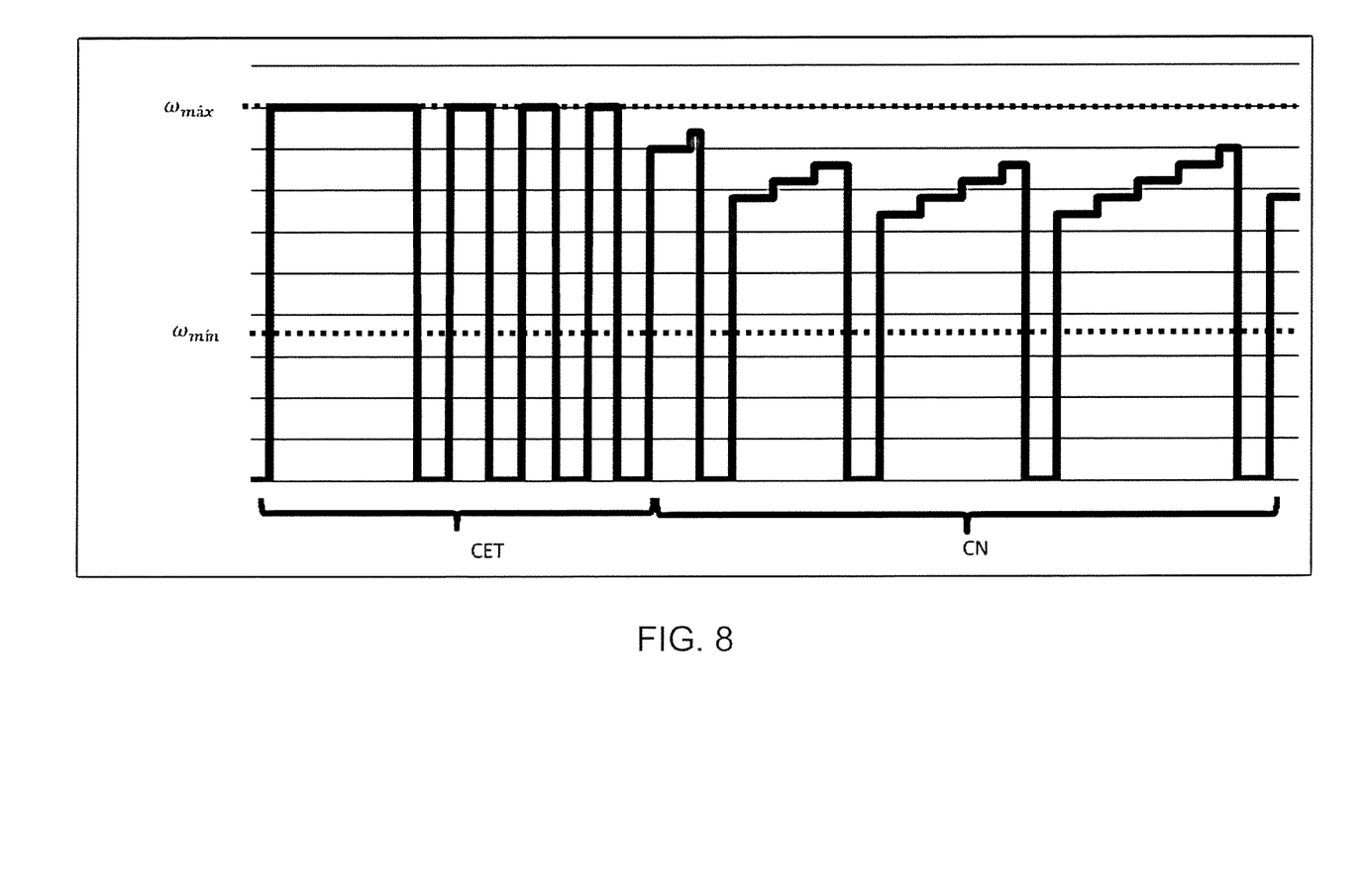
FIG. 8—is an exemplification of a complete waveform with a given number of steps that will occur in a cycle.

So, for example, if the target time ($t_{target}$) is sixty minutes and the number of steps ($n_{etapas}$) equal to 3 (which is to say, $t_{target}$=60 min and $n_{etapas}$=3), the speed will increase every 15 minutes, as exemplified in FIG. 8.

As such, as can be observed principally in the examples and embodiments described above, said normal cycle is configured as an angular speed control cycle of the compressor.

Regarding the specific logic, this is configured as a routine which principally monitors the torque of a motor of the compressor, which is proportional to the temperature of the load. This monitoring occurs to address disturbances and exceptional cases of the system.

Such disturbances comprise, for example, the opening of the fridge door, hot gas resistance, defrosting, etc. In a general sense, the disturbances can be understood as specifically thermal disturbances which can cause in increase of thermal load in the refrigeration system.

Based on the torque variation curve, it is possible to detect "signatures" (patterns, fingerprints) and to take decisions related to the operation of the compressor such as a change, or not, in its speed.

As such, the specific logic comprises at least one step of monitoring disturbances, allowing the refrigeration system to operate in extreme and unusual situations.

To this end, the specific logic is configured to realize at least the following steps:
  Alter the angular speed of the compressor through the monitoring of a sequential set of loads ($C_{sc}$);
  Detect disturbances in the refrigeration system based on the sequential set of loads ($C_{sc}$).

As such, the specific logic operates in parallel with the general logic, such that its operation begins after the stabilization of the system and is periodic. Moreover, this logic is configured to control the angular speed of the compressor at the time of the detection of disturbances in the refrigeration system, where the detection of disturbances in the refrigeration system occurs based on the sequential set of loads ($C_{sc}$), where the angular speed of the compressor is altered being configured to optimize a refrigeration capacity of the refrigeration system and achieve a target temperature.

Regarding the cited sequential set of loads ($C_{sc}$), this can be understood as a set of measurements of at least a magnitude related to the refrigeration system, where the measuring may be realized, for example, in a given period of time, with intervals (Int) that are also predetermined.

To exemplify one possible characteristic of the cited sequential set of loads ($C_{sc}$), in one possible configuration this set comprises n measurements (calibrations) of torque, in a period of time, where samples are calibrated with a specific interval (Int).

Following the third calibration, the samples of the sequential set of loads ($C_{sc}$) are analyzed with the aim of detecting a load variation pattern through possible variations in the magnitude verified, in the case of the torque. If a pattern is detected, the angular speed of the motor of the compressor will be altered and the calibration will begin again after the stabilization of the refrigeration system. Otherwise, if nothing is detected, then the samples of the sequential set of loads ($C_{sc}$) are shifted (the first is discarded, the second becomes the first, the third becomes the second and so on) and another sample is calibrated after the interval (Int).

Again, it should be highlighted that the values mentioned are mere examples and should not be taken as limitations of the invention. In addition to this, alternative configurations may comprise, for example, using closed groups of magnitudes to form the sequential set of loads ($C_{sc}$) or even increments over time, such that the configuration with shifts mentioned above should not be understood as a limitation for the present invention.

Specifically regarding the detection of patterns (fingerprints), these can be based on a calculation of torque variation ($\Delta 1$, $\Delta 2$), as previously described and also as described in the formulas below, with an exemplification shown in FIG. 9. It should be observed, in this example, that the sequential set of loads ($C_{sc}$) is composed of measured loads 1, 2 and 3 ($C_{med1}$, $C_{med2}$ and $C_{med3}$ respectively). Thus, we observe:

$$\Delta 1 = \frac{C_{med2} - C_{med1}}{C_{med1}} * 100 \qquad \text{Eq. 4a}$$

$$\Delta 2 = \frac{C_{med2} - C_{med1}}{C_{med1}} * 100 \qquad \text{Eq. 4b}$$

So, the parameters calculated ($\Delta 1$, $\Delta 2$) are compared with reference parameters, such as those illustrated in FIG. 9.

One configuration also provides for the detection of disturbances when the refrigeration system is disconnected, which is to say, when there are no parameters (measured loads), for example of torque, to be measured and considered.

So, to detect disturbances which may occur when the system is disconnected (there is no torque to measure), the variation in the first load measured is used, which is to say, the load measured with the refrigeration system already stable, after being switched on.

If this measure varies more than a pre-established limit, such as 30% of the last cycle, it is understood that a disturbance occurred while it was disconnected, such that the angular speed of the motor is defined for a maximum value.

So, based on the characteristics described, a method is foreseen configured principally to identify and correct disturbances in the refrigeration system and to activate the compressor at an angular speed of greater efficiency for the cited refrigeration system.

It is important to note that said efficiency of the refrigeration system may be different from the efficiency of the compressor motor in isolation. As such, in other words, the present invention is configured as described to activate the compressor at optimum angular speed for the cited refrigeration system, and may or may not be equal to the optimum speed of the compressor itself.

The present invention also comprises a compressor control system in a refrigeration system.

The system basically comprises a compressor, a measuring unit, a thermostat and a data processing unit, being configured by means of the implementation of at least one general logic and one specific logic, with the previously mentioned characteristics.

Regarding the components of the present system, the compressor is configured like a variable capacity compressor.

While the measuring unit is configured like a device capable of measuring loads as previously described, such as torque, current and electrical tension.

The thermostat, in turn, is configured to verify data related to heat exchange and temperature variation in the refrigeration system.

The data processing unit is configured to receive data verified from the other components and to act principally on the refrigeration system, to command the realization of steps, cycles and actions as previously described.

In the context of the present invention, these principal components comprise a control system configured thus to allow the implementation of the control method described previously In addition to this, it is worth mentioning that this system also comprises at least one environment to be refrigerated, so that the calibrations principally related to heat exchange and temperature variation in the refrigeration system are realized in this environment.

Moreover, it is observed that a refrigerator may be configured in accordance with the present invention, being thus equipped with a refrigeration system to allow for the implementation of the control method hereby described.

Finally, the present invention also comprises a compressor configured like the method and system previously described, where said compressor is preferably configured like a variable speed compressor compatible with the characteristics described above.

Having provided a description of an example of a preferred materialization, it should be understood that the scope of the present invention encompasses other possible variations, being limited only by the contents of the attached claims, with the possible equivalents thereby included.

The invention claimed is:

1. A compressor control method in a refrigeration system including a load stabilization cycle, a normal cycle, and a disturbance monitoring cycle, the compressor control method comprising:
performing at least two sequential load stabilization cycles, each load stabilization cycle including
obtaining a previous load ($C_{ant}$) and a current load ($C_{atu}$), wherein the previous load ($C_{ant}$) and the current load ($C_{atu}$) are determined from a parameter of the compressor, and
obtaining a cycle load ($C_{cpd}$) by calculating a difference between the previous load ($C_{ant}$) and the current load ($C_{atu}$),
performing the normal cycle, the normal cycle including
obtaining a measured cycle time ($t_{cycle}$) and a target time ($t_{target}$), the target time ($t_{target}$) being stipulated by a user, and
comparing the measured cycle time ($t_{cycle}$) and the target time ($t_{target}$); and
performing the disturbance monitoring cycle, the disturbance monitoring cycle including monitoring a sequential set of loads ($C_{sc}$) determined from the parameter of the compressor,
altering an angular speed of the compressor, and
detecting disturbances in the refrigeration system based on the monitoring of the sequential set of loads ($C_{sc}$),
wherein, when the cycle load ($C_{cpd}$) is greater than or equal to a reference load ($C_{ref}$), the load stabilization cycle is repeated,
wherein, when the cycle load ($C_{cpd}$) is less than the reference load ($C_{ref}$), the load stabilization cycle ends and the normal cycle is performed, and
wherein the disturbance monitoring cycle is performed simultaneously with the normal cycle.

2. The compressor control method according to claim 1, wherein the normal cycle comprises selecting a desired angular speed ($\omega_{next}$) of the compressor,
wherein the desired angular speed ($\omega_{next}$) of the compressor is configured to optimize efficiency of the refrigeration system, and
wherein the desired angular speed ($\omega_{next}$) is selected based on a comparison of the measured cycle time ($t_{cycle}$) and the target time ($t_{target}$), and at least one of a current angular speed ($\omega_{atual}$) of the compressor, a gain (Agr), or a speed step unit ($\omega_{ssu}$).

3. The compressor control method according to claim 1, wherein the sequential set of loads ($C_{sc}$) comprise n measurements of loads in a time period with a specific interval (Int), and
wherein, when at least one variation pattern of the sequential set of loads ($C_{sc}$) is detected, the angular speed of the compressor is altered and the load stabilization cycle is repeated.

4. A compressor control system of a refrigeration system, the compressor control system configured to implement a general logic process including a load stabilization cycle and a normal cycle, and a specific logic process including a disturbance monitoring cycle, the compressor control system comprising:
a compressor configured to cool the refrigeration system;
a thermostat configured to active or deactivate the compressor control system; and
a processor coupled to the compressor, the thermostat, and the compressor sensor, the processor configured to:
process information relating to loads measured in the general logic process and the specific logic process, the loads being determined from a parameter of the compressor,
monitor, during the disturbance monitoring cycle, a sequential set of loads ($C_{sc}$); and
determine, during the load stabilization cycle, a cycle load ($C_{cpd}$) by calculating a difference between a previous load ($C_{ant}$) and a current load ($C_{atu}$),
compare, during the normal cycle, a measured cycle time ($t_{cycle}$) and a target time ($t_{target}$) stipulated by a user
control, during the disturbance monitoring cycle, the angular speed of the compressor based on monitoring the sequential set of loads ($C_{sc}$), and
detect, during the disturbance monitoring cycle, disturbances in the refrigeration system based on the monitoring of the sequential set of loads ($C_{sc}$),
wherein the compressor control system is configured to change from the load stabilization cycle to the normal cycle when the load stabilization cycle concludes, and
wherein the specific logic process is performed after the load stabilization cycle.

5. The compressor control system according to claim 4, wherein the compressor sensor is configured to obtain the previous load ($C_{ant}$) and the current load ($C_{atu}$), and
wherein the processor is configured to compare the cycle load ($C_{cpd}$) with a reference load ($C_{ref}$).

6. The compressor control system according to claim 5, wherein the load stabilization cycle repeats when the cycle load ($C_{cpd}$) is greater than or equal to the reference load ($C_{ref}$), the load stabilization cycle being configured to optimize a refrigeration capacity of the refrigeration system and to minimize a temperature homogenization time in a thermal load.

7. The compressor control system according to claim 6, wherein
the processor is configured to select, during the normal cycle, a desired angular speed ($\omega_{next}$) of the compressor based on a comparison of the measured cycle time ($t_{cycle}$), the target time ($t_{target}$), and at least one of a current speed ($\omega_{atual}$) of the compressor, a gain (Agr), or a speed step unit ($\omega_{ssu}$), the desired angular speed ($\omega_{next}$) of the compressor being configured to optimize the efficiency of the refrigeration system.

8. The compressor control system according to claim 7, wherein the processor is configured to change from the load stabilization cycle to the normal cycle when the cycle load ($C_{cpd}$) is lower than the reference load ($C_{ref}$).

9. The compressor control system according to claim 8, wherein the processor is configured to control, during the specific logic process, the angular speed of the compressor at the time of the detection of disturbances in the refrigeration system,
wherein the angular speed of the compressor is altered to optimize a refrigeration capacity of the refrigeration system and to restore the system following disturbances,
wherein the detection of disturbances in the refrigeration system occurs based on the monitoring of the sequential set of loads ($C_{sc}$), the sequential set of loads ($C_{sc}$) comprising n measurements of loads in a time period with a specific interval (Int) and
wherein, when at least one variation pattern of the sequential set of loads ($C_{sc}$) is detected, the angular speed of the motor of the compressor is altered and the load stabilization cycle is repeated.

10. The compressor control system according to claim 4, wherein the refrigeration system is a refrigerator.

11. A load stabilization method of stabilizing a load in a refrigeration system, so as to optimize a refrigeration capacity of the refrigeration system and minimize a temperature homogenization time in a thermal load, the load stabilization method comprising:
obtaining a previous load ($C_{ant}$), a current load ($C_{atu}$), and a reference load ($C_{ref}$), the previous load ($C_{ant}$), the current load ($C_{atu}$), and the reference load ($C_{ref}$) determined based on a torque of a compressor;
obtaining a cycle load ($C_{cpd}$) by calculating the difference between the previous load ($C_{ant}$) and the current load ($C_{atu}$);
comparing the cycle load ($C_{cpd}$) with the reference load ($C_{ref}$);
determining whether to repeat the load stabilization cycle, wherein the load stabilization method is repeated when the cycle load ($C_{cpd}$) is greater than or equal to the reference load ($C_{ref}$).

12. A method of controlling an angular speed of a compressor to optimize efficiency of a refrigeration system, the method comprising:
obtaining a measured cycle time ($t_{cycle}$) and a target time ($t_{target}$), the target time ($t_{target}$) being stipulated by a user;
comparing the measured cycle time ($t_{cycle}$) and the target time ($t_{target}$);
selecting, based on the comparison of the measured cycle time ($t_{cycle}$), the target time ($t_{target}$), and at least one of a current speed ($\omega_{atual}$) of the compressor, a gain (Agr), and a speed step unit ($\omega_{ssu}$), a desired angular speed ($\omega_{next}$) of the compressor,
wherein the method is performed in response to stabilizing torque of the compressor.

13. A method of detecting disturbances in a refrigeration system, the method comprising:
monitoring a sequential set of loads ($C_{sc}$), the sequential set of loads ($C_{sc}$) determined by measuring torque of a compressor;
altering an angular speed of a compressor based on the monitoring of the sequential set of loads ($C_{sc}$), wherein the angular speed of the compressor is altered to optimize the refrigeration capacity of the refrigeration system and to restore the system following disturbances; and
detecting, based on the sequential set of loads ($C_{sc}$) having n measurements of loads in a period of time with a specific interval (Int), disturbances in the refrigeration system,
wherein, when a pattern of the sequential set of loads ($C_{sc}$) is detected, the angular speed of the compressor motor is altered and the method is repeated after torque stabilization of the refrigeration system, and
wherein, when no pattern of the sequential set of loads ($C_{sc}$) is detected, a first load value of the sequential set of loads ($C_{sc}$) is discarded, the remaining n measurements of loads are shifted forward in the set, and another sequential set of loads ($C_{sc}$) is verified following the interval (Int).

14. The compressor control method of claim 1, wherein the parameter of the compressor is a torque of the compressor.

15. The compressor control method of claim 1, wherein the parameter of the compressor is electrical current, electrical resistance, or electrical tension of the compressor.

* * * * *